S. L. FRASER.
MANURE DISTRIBUTER AND SEED SOWER.
No. 108,469.            Patented Oct. 18, 1870.
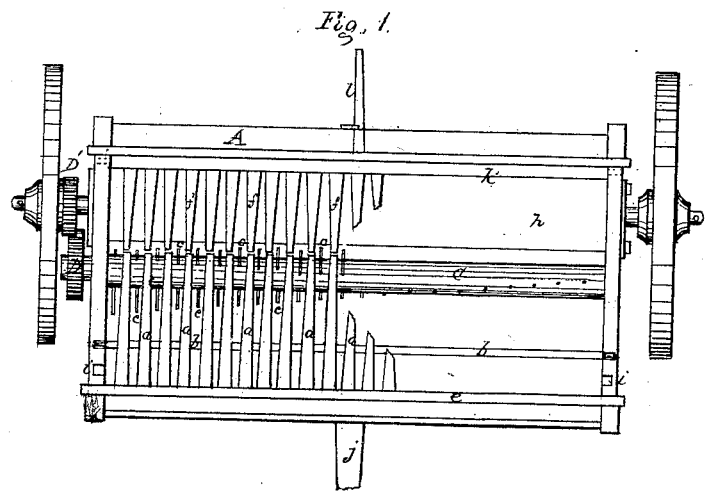
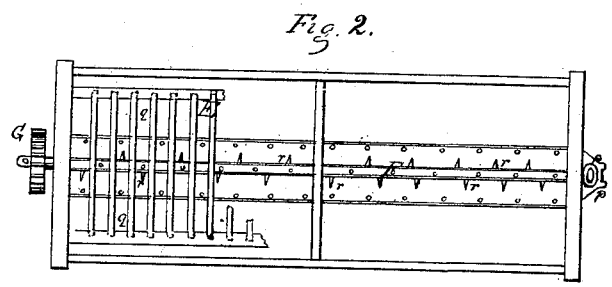
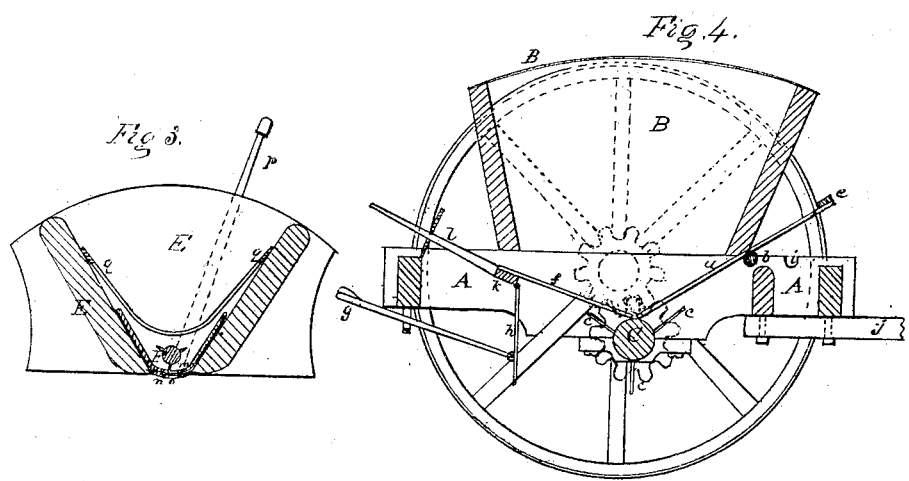

United States Patent Office.

SPENCER LEE FRASER, OF WEST TOWN, NEW YORK.

Letters Patent No. 108,469, dated October 18, 1870.

IMPROVEMENT IN MANURE-DISTRIBUTERS AND SEED-SOWERS.

The Schedule referred to in these Letters Patent and making part of the same.

I, SPENCER LEE FRASER, of West Town, in the county of Orange and State of New York, have invented certain Improvements in Machines for Distributing Manure and Sowing Seed, of which the following is a specification.

The object of my invention is the production of a machine which will supersede manual labor for spreading the different kinds of fertilizers for the soil; and It consists of the arrangement and combination of parts herein described.

Figure 1 is a plan of my improved machine as arranged for distributing manure, the box and parts of the guards and slats being omitted.

Figure 2, a plan of the seed-sowing box, with part of the screen omitted.

Figure 3, an enlarged vertical cross-section of the same.

Figure 4, a transverse vertical section of the box for holding the manure and the operating parts connected therewith In the accompanying drawing—

A is a frame-work mounted upon an axle, with two wheels having broad tires.

Upon this frame I provide a box or hopper, B, with slightly-inclined sides, for holding and hauling the manure, which is preferably about six feet in length, situated longitudinally of the axle, and preferably a little in advance of it.

Beneath this box or hopper is a cylinder, C, which rests in bearings at each end of the frame A, and is connected, by the pinion D on the shaft of the cylinder, with a driving-gear, D', on one of the driving-wheels.

This cylinder is provided with three or more rows of teeth, $c\ c$, extending radially therefrom, and which run in a spiral direction on the surface of the cylinder.

Over the cylinder I set a series of inclined slats or guards, $a\ a$, fixed to a pivoted bar, $b$, in such a manner that by a lever attached thereto, or other suitable device, they may be raised or lowered at their lower extremity.

They are united together by the cross-bar $e$ at the opposite ends, and additional bearings, $i\ i$, are provided in the frame, to which the bar $b$ may be adjusted, enabling the slats to project over the cylinder C, or stop short of it, by which means the discharge of material from the box or hopper is regulated.

Immediately opposite to the ends of these guards, and corresponding in position with them, is a series of spring slats, $f\ f$, which are likewise fastened to a pivot-bar, $k$, and, in the same manner, are capable of being changed in position to increase or diminish the discharge-opening according as the manure is coarse or fine.

These springs are arranged at such a distance apart as to allow the teeth $c\ c$ upon the cylinder to revolve freely between them.

These teeth catch portions of the manure, draw it through, and drop it evenly upon the ground below.

The springs sustain the mass of manure above them, and allow it to be fed uniformly through, but yield sufficiently to permit sticks, stones, or other obstructions, to pass through without arresting the motion or injuring the machine.

The springs are varied in their inclination by a ratchet-lever, $l$.

Hinged to the bar $k$, which supports the springs, is an apron, $h$, of wood or metal, pendent below the springs. This is employed to close the interstices between the springs, when it is necessary to do so, to prevent the more finely pulverized material sifting through while being conveyed from the place of loading to the field where it is to be distributed.

The opening and closing is effected by means of a lever, $g$, fig. 4, which is suitably connected with the frame A to secure the apron in a position when so required.

The manure-box distributer is removable from the frame A, and for it may be substituted a broadcast seed-sower, for sowing seed, spreading lime, plaster, and other fine fertilizers, as compounds. This consists of a box, E, fig. 2, having inclined sides, and divided transversely into two or more compartments, so that one, two, or the whole may be used, as is necessary.

The lower or bottom part of this box is semicircular, with a series of perforations, $m\ m$, for the discharge of the seed, or other material.

Beneath this I adjust a sliding plate, $n\ n$, also provided with corresponding holes, $o\ o$.

By means of lever $p$ longitudinal motion may be imparted to the slide, and the openings in the box thereby enlarged or diminished, to adapt them to the size of the seed, or other material, being sown, or may be entirely closed when required.

Passing longitudinally through the box is a small cylinder or rod, F, having short radial spikes, $r\ r$, so arranged that in the revolution of the rod the teeth will pass successively over and near the holes in the box, keeping them free, and agitating the material, so that it may escape freely.

The rod F receives motion from the driving-gear D' by means of the pinion G on the end, so arranged as to admit of being thrown in and out of gear at will.

A screen or grating, $q\ q$, consisting of a frame, formed of parallel slats or wires, their ends connected by longitudinal strips, the slats being bent to conform somewhat to the converging sides of the box, is placed above the rod F, and at such distance from it that the radial teeth rotate between the wires or slats, agitating and loosening the seed, or other material, while any hard or foreign substance will be retained above the screen.

The manure-distributer and the seeding-box may be substituted one for the other upon the frame and driving gear, thus adapting it to perform the functions of separate machines.

When it is desirable a short reach may be substituted for the draft-pole $j$, and the machine connected with the forward part or wheels of a wagon.

The construction and operation are simple, and adapted for all kinds of fertilizers, seeds, lime, plaster, &c.

What I claim is—

1. The combination of the adjustable series of spring slats $ff$ and guards $a\ a$ with the spiked cylinder C, box B, and driving-gear D', for distributing coarse manure, substantially as set forth.

2. The arrangement and combination of the curtain $h$ and lever $g$ with the bar $k$ and spring slats $ff$, substantially in the manner and for the purpose set forth.

3. The broadcast sower, consisting of the box E, with concave perforated bottom $m$ and slide $n$, lever $p$, and agitator F, operated by the driving-gear D', substantially as described.

4. The broadcast sower, consisting of the box E, with concave perforated bottom $m$ and slide $n$, lever $p$, agitator F, screen or grating $q\ q$, and driving-gear D', the whole combined, arranged, and operating substantially as set forth.

SPENCER LEE FRASER.

Witnesses:
WHEELER W. PHILLIPS,
KATE N. JONES.